US009175826B2

(12) United States Patent
Kaneda

(10) Patent No.: US 9,175,826 B2
(45) Date of Patent: Nov. 3, 2015

(54) ILLUMINATING UNIT AND DISPLAY

(71) Applicant: Sony Corporation, Tokyo (JP)

(72) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 215 days.

(21) Appl. No.: 13/787,286

(22) Filed: Mar. 6, 2013

(65) Prior Publication Data

US 2013/0235353 A1    Sep. 12, 2013

(30) Foreign Application Priority Data

Mar. 9, 2012    (JP) ................................. 2012-052540

(51) Int. Cl.
| | |
|---|---|
| *G03B 21/28* | (2006.01) |
| *F21V 5/04* | (2006.01) |
| *G03B 21/14* | (2006.01) |
| *G02B 27/12* | (2006.01) |
| *G02B 27/09* | (2006.01) |
| *G03B 21/20* | (2006.01) |
| *G02B 27/48* | (2006.01) |
| *H04N 9/31* | (2006.01) |

(52) U.S. Cl.
CPC . *F21V 5/04* (2013.01); *G02B 27/09* (2013.01); *G02B 27/0905* (2013.01); *G02B 27/0961* (2013.01); *G02B 27/123* (2013.01); *G02B 27/48* (2013.01); *G03B 21/14* (2013.01); *G03B 21/208* (2013.01); *H04N 9/3111* (2013.01); *H04N 9/3152* (2013.01); *H04N 9/3161* (2013.01)

(58) Field of Classification Search
CPC .... G03B 21/208; G03B 27/123; G03B 27/09; G03B 27/0905
USPC .................... 353/38, 102; 362/309, 308, 307, 362/326–340, 311.12, 331, 333
See application file for complete search history.

(56) References Cited

U.S. PATENT DOCUMENTS

| | | | | |
|---|---|---|---|---|
| 4,769,750 | A * | 9/1988 | Matsumoto et al. | 362/268 |
| 4,939,630 | A * | 7/1990 | Kikuchi et al. | 362/268 |
| 5,098,184 | A * | 3/1992 | van den Brandt et al. | 353/102 |
| 2010/0296065 | A1* | 11/2010 | Silverstein et al. | 353/38 |
| 2011/0007240 | A1* | 1/2011 | Qu et al. | 349/62 |

FOREIGN PATENT DOCUMENTS

| | | |
|---|---|---|
| JP | 2002-311382 | 10/2002 |
| JP | 2012-008549 | 1/2012 |

* cited by examiner

*Primary Examiner* — William C Dowling
(74) *Attorney, Agent, or Firm* — K&L Gates LLP

(57) ABSTRACT

An illuminating unit includes: a light source section including a laser light source; a first uniformizing optical member on which light from the light source section is incident; and a second uniformizing optical member including a plurality of first unit cells and a plurality of second unit cells and on which light from the first uniformizing optical member is incident. The first unit cells are arranged on a light incidence surface of the second uniformizing optical member and each have an anisotropic shape with a major-axis direction as a first direction and a minor-axis direction as a second direction, and the second unit cells are arranged on a light emission surface of the second uniformizing optical member and each have a shape protruding along both the first direction and the second direction.

16 Claims, 10 Drawing Sheets

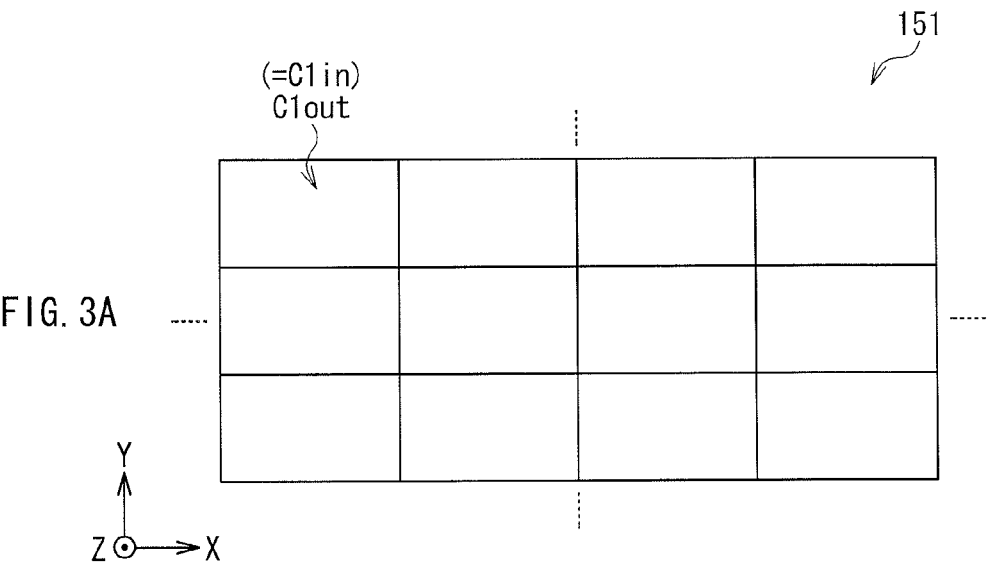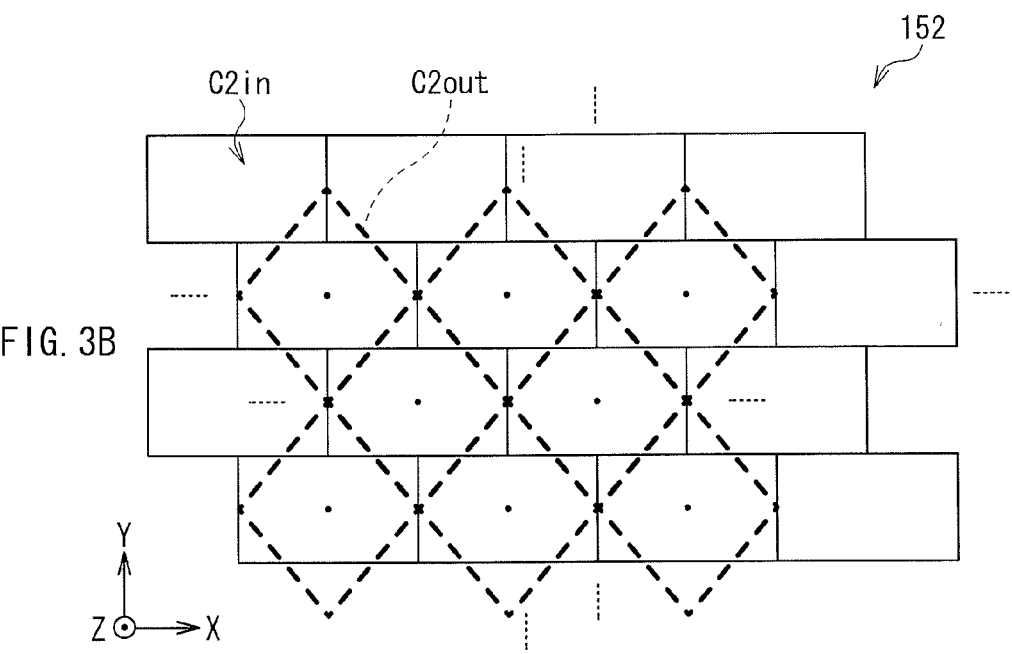

COMPARATIVE EXAMPLE 1

COMPARATIVE EXAMPLE 2

ILLUMINATING UNIT AND DISPLAY

CROSS REFERENCES TO RELATED APPLICATIONS

The present application claims priority to Japanese Priority Patent Application JP 2012-052540 filed in the Japan Patent Office on Mar. 9, 2012, the entire content of which is hereby incorporated by reference.

BACKGROUND

The present disclosure relates to an illuminating unit applying light including laser light, and a display performing image display using such an illuminating unit.

An optical module as one of major component parts of a projector (projection display) is generally configured of an illumination optical system (illuminating unit) including a light source, and a projection optical system including a light modulation device. In the field of such projectors, a small (palm-sized) and lightweight, portable projector called microprojector is beginning to be widespread. In the microprojector, a light emitting diode (LED) has been mainly used as the light source for the illuminating unit.

On the other hand, laser is now the subject of interest as a new light source for the illuminating unit. For example, a green semiconductor laser is being developed following the commercialization of high-output blue and red semiconductor lasers, and is reaching a practical application level. Due to such a background, there has been proposed a projector including monochrome lasers (semiconductor lasers) of three primary colors of red (R), green (G), and blue (B) as light sources for the illuminating unit. A projector having a wide color reproduction range and exhibiting small power consumption is achieved through use of the monochrome lasers as the light sources.

In addition, such a projector generally has a predetermined uniformizing optical system (uniformizing optical member) in an illuminating unit to uniformize the light quantity distribution (intensity distribution) of illumination light emitted from the illuminating unit. For example, Japanese Unexamined Patent Application Publication Nos. 2002-311382 and 2012-8549 each disclose two (a pair of) fly-eye lenses as the uniformizing optical member.

SUMMARY

In such a projector, it is, in general, necessary to reduce loss of the quantity of light emitted from a light source to improve light use efficiency.

It is desirable to provide an illuminating unit that allow a reduction in loss of the quantity of light, and a display including the illuminating unit.

An illuminating unit according to an embodiment of the disclosure includes: a light source section including a laser light source; a first uniformizing optical member on which light from the light source section is incident; and a second uniformizing optical member including a plurality of first unit cells and a plurality of second unit cells and on which light from the first uniformizing optical member is incident. The first unit cells are arranged on a light incidence surface of the second uniformizing optical member and each have an anisotropic shape with a major-axis direction as a first direction and a minor-axis direction as a second direction. The second unit cells are arranged on a light emission surface of the second uniformizing optical member and each have a shape protruding along both the first direction and the second direction.

A display according to an embodiment of the disclosure includes: an illuminating unit emitting illumination light; and a light modulation device modulating the illumination light based on an image signal. The illuminating unit includes: a light source section including a laser light source; a first uniformizing optical member on which light from the light source section is incident; and a second uniformizing optical member including a plurality of first unit cells and a plurality of second unit cells and on which light from the first uniformizing optical member is incident. The first unit cells are arranged on a light incidence surface of the second uniformizing optical member and each have an anisotropic shape with a major-axis direction as a first direction and a minor-axis direction as a second direction. The second unit cells are arranged on a light emission surface of the second uniformizing optical member and each have a shape protruding along both the first direction and the second direction.

In the illuminating unit and the display according to the above-described respective embodiments of the disclosure, the light from the light source passes through the first uniformizing optical member and the second uniformizing optical member in this order so that quantity of the light is uniformized, and the uniformized light is emitted in a form of illumination light. In the second uniformizing optical member, each of the first unit cells that are arranged on the light incidence surface thereof has the anisotropic shape with the major-axis direction as the first direction and the minor-axis direction as the second direction, and each of the second unit cells arranged on the light emission surface thereof has the shape protruding along both the first and second directions. As a result, even when the first unit cell on the light incidence surface has the anisotropic shape, an angle (incident angle) of light, which is incident on the second uniformizing optical member from the first uniformizing optical member, easily comes into equal to or smaller than a predetermined allowable angle even if the incident angle is along the minor-axis direction.

According to the illuminating unit and the display of the above-described respective embodiments of the disclosure, in the second uniformizing optical member, each of the first unit cells arranged on the light incidence surface thereof has the anisotropic shape with the major-axis direction as the first direction and the minor-axis direction as the second direction, and each of the second unit cells arranged on the light emission surface thereof has the shape protruding along both the first and second directions. This allows an incident angle of light incident on the second uniformizing optical member to easily come into equal to or smaller than a predetermined allowable angle. Consequently, loss of the quantity of light is reduced in applying light (illumination light) emitted from the second uniformizing optical member to a subsequent stage (to a light modulation device, for example).

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

FIGS. 3A and 3B are schematic diagrams illustrating an exemplary configuration of two fly-eye lenses illustrated in FIG. 1.

DETAILED DESCRIPTION

Hereinafter, an embodiment of the present disclosure will be described in detail with reference to the accompanying drawings. It is to be noted that description is made in the following order.

1. Embodiment (example where a second unit cell on a light incidence surface of a second uniformizing optical member has a rhombic shape).
2. Modifications (Modifications 1 to 3: each second unit cell has a cross or hexagonal shape).
3. Other Modifications Embodiment Configuration of Display 3

Figure 1:
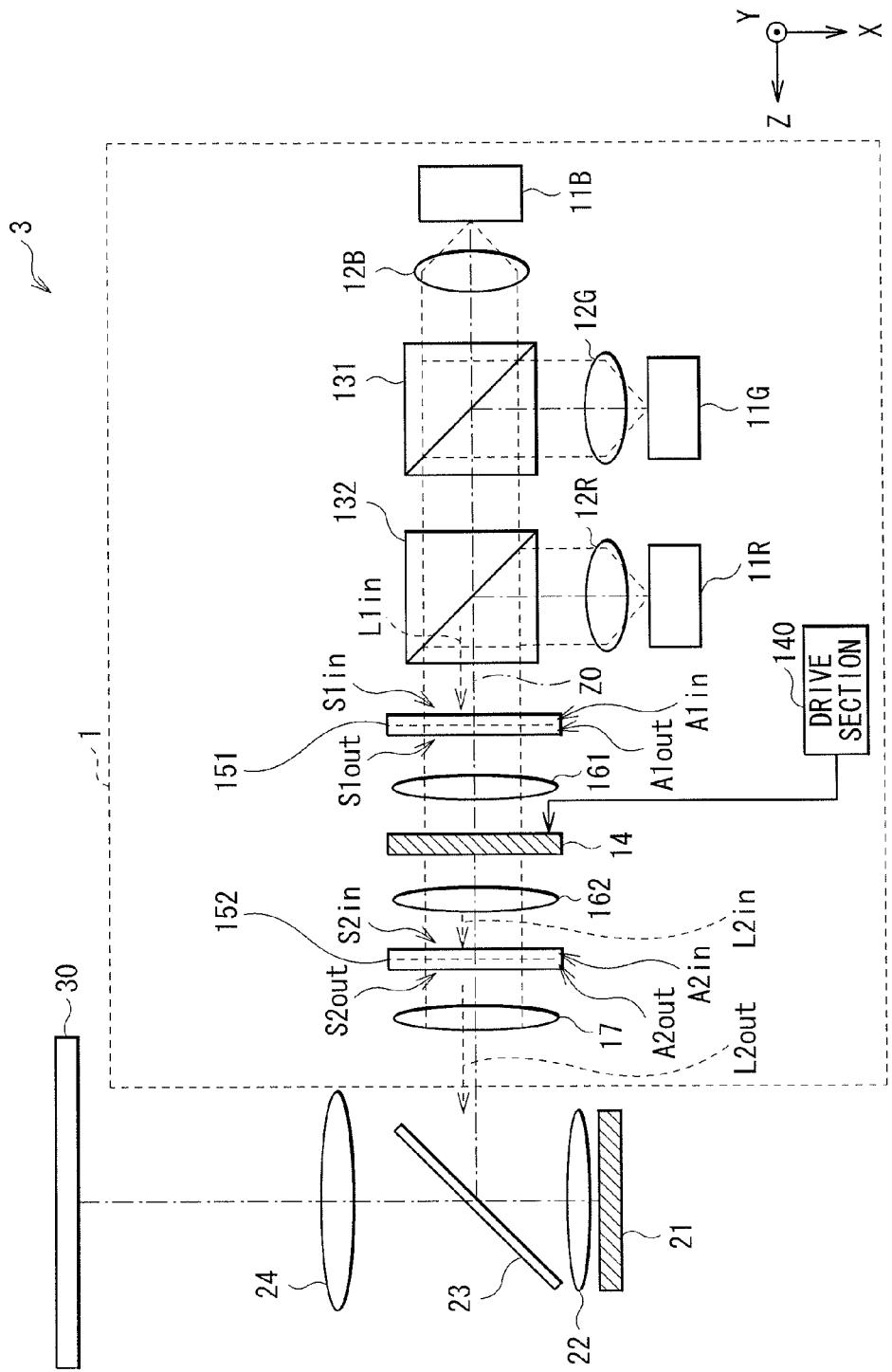
FIG. 1 is a diagram illustrating an overall configuration of a display according to an embodiment of the disclosure.

FIG. 1 illustrates an overall configuration of a display (display 3) according to an embodiment of the disclosure. The display 3 is a projection display that projects an image (image light) onto a screen 30 (a plane of projection), and includes an illuminating unit 1, and an optical system (a display optical system) for image display using illumination light from the illuminating unit 1.

(Illuminating Unit 1)

The illuminating unit 1 includes: a red laser 11R; a green laser 11G; a blue laser 11B; coupling lenses 12R, 12G, and 12B; dichroic prisms 131 and 132; an optical device 14; a drive section 140; fly-eye lenses 151 and 152, sub-condenser lenses 161 and 162; and a condenser lens 17. It is to be noted that Z0 represents a light axis in FIG. 1.

The red laser 11R, the green laser 11G, and the blue laser 11B are three kinds of light sources that emit red laser light, green laser light, and blue laser light, respectively. These laser light sources configure a light source section. The three kinds of light sources are each a laser light source in this example embodiment. The red laser 11R, the green laser 11G, and the blue laser 11B each may emit light, for example, in a pulsed manner. Specifically, each laser may intermittently (in an on-and-off fashion) emit laser light at a predetermined emission frequency (emission period). The red laser 11R, the green laser 11G, and the blue laser 11B may be each configured of any suitable laser such as a semiconductor laser and a solid-state laser, for example. For example, in the case where the laser light sources are each configured of a semiconductor laser, a wavelength $\lambda r$ of the red laser light may be about 600 nm to about 700 nm both inclusive, a wavelength of the green laser light may be about 500 nm to about 600 nm both inclusive, and a wavelength $\lambda b$ of the blue laser light may be about 400 nm to about 500 nm both inclusive, for example.

Figure 2A:
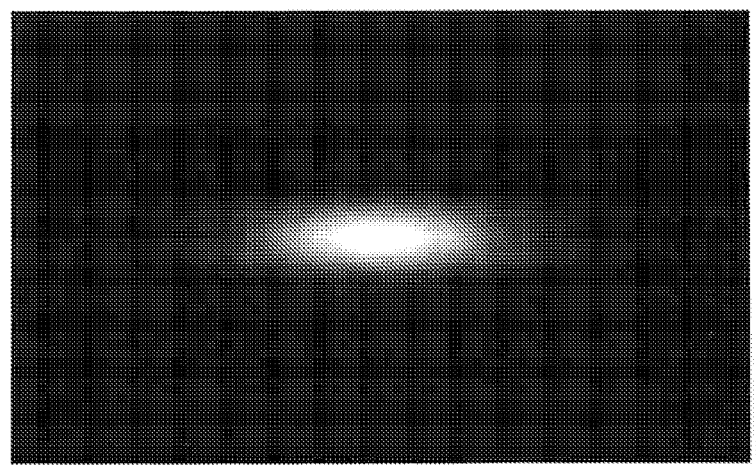
FIGS. 2A and 2B are diagrams illustrating exemplary distribution of the quantity of laser light.
Figure 2B:
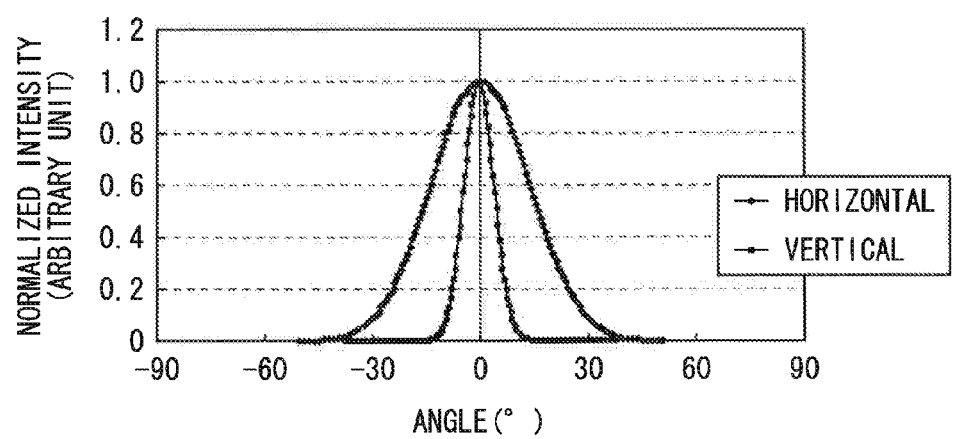

The laser light emitted from each laser light source is generated in response to incidence of excitation light on a laser medium including a laser crystal. The intensity distribution (distribution of the quantity of light, or far field pattern (FFP)) of the laser light is determined depending on distribution of atoms or molecules of the laser crystal as the laser medium, and/or size of the laser crystal. Ideally, for example, as illustrated in FIGS. 2A and 2B, distribution (profile) of the quantity of emitted laser light substantially shows Gaussian distribution. It is to be noted that "horizontal" and "vertical" in FIG. 2B refer to distribution of the quantity of light along a horizontal direction (here, an X-axis direction) and a vertical direction (here, a Y-axis direction), respectively.

The coupling lens 12G is a lens (coupling lens) that collimates the green laser light emitted from the green laser 11G (into parallel light) so as to be coupled with the dichroic prism 131. Similarly, the coupling lens 12B is a lens (coupling lens) that collimates the blue laser light emitted from the blue laser 11B so as to be coupled with the dichroic prism 131. The coupling lens 12R is a lens (coupling lens) that collimates the red laser light emitted from the red laser 11R so as to be coupled with the dichroic prism 132. It is to be noted that although these coupling lenses 12R, 12G, and 12B each collimate incident laser light (into parallel light) in this example embodiment, this is not limitative, and the coupling lenses 12R, 12G, and 12B may not collimate the incident laser light (into parallel light). Size of a display configuration, however, is advantageously reduced through collimation of the incident laser light as described above.

The dichroic prism 131 is a prism that selectively transmits the blue laser light received through the coupling lens 12B, and selectively reflects the green laser light received through the coupling lens 12G. The dichroic prism 132 is a prism that selectively transmits the blue laser light and the green laser light emitted from the dichroic prism 131, and selectively reflects the red laser light received through the coupling lens 12R. This allows color composition (optical path composition) of the red laser light, the green laser light, and the blue laser light.

The optical device 14 is disposed on an optical path between the light source section and the fly-eye lens 152 (specifically, between the fly-eye lenses 151 and 152). The optical device 14 is an optical device that reduces so-called speckle noise (an interference pattern), and laser light, advancing on the above-described optical path, passes through the optical device 14. The drive section 140 drives the optical device 14. The drive section 140 (finely) vibrates the optical device 14, for example, along the light axis Z0 or along a direction perpendicular to the light axis Z0, thereby a state of a beam passing through the optical device 14 varies so that the speckle noise is reduced.

Each of the fly-eye lenses 151 and 152 is an optical member (integrator) including a plurality of lenses (unit cells described later) arranged two-dimensionally on a substrate, and spatially divides incident beams depending on arrangement of the lenses, and emits the divided beams. The fly-eye lens 151 is a former-stage fly-eye lens as viewed from the light source section, which is, in this example embodiment, disposed on an optical path between the dichroic prism 132 and the optical device 14. The fly-eye lens 152 is a latter-stage fly-eye lens, which is, in this example embodiment, disposed on an optical path between the optical device 14 and the condenser lens 17. The fly-eye lenses 151 and 152 each emit the divided beams in a superimposed manner. This allows light emitted from the fly-eye lens 152 to be uniformized, i.e., allows in-plane distribution of the quantity of light to be uniformized, and is emitted in a form of illumination light. It is to be noted that the fly-eye lenses 151 and 152 each have unit cells (unit cells each having a predetermined curvature) not only on the light incidence surface but also on the light emission surface thereof as described below, in order to efficiently use obliquely incident light as the illumination light.

The fly-eye lens 151 has an incidence-side array A1in including a plurality of unit cells arranged on a light incidence surface S1in onto which incident light L1in is to be incident from the light source section. In addition thereto, the fly-eye lens 151 has an emission-side array A1out including a plurality of unit cells arranged on a light emission surface S1out through which light is emitted.

Specifically, for example, as illustrated in FIG. 3A, the fly-eye lens 151 has a plurality of incidence-side unit cells C1in on the light incidence surface S1in, and has a plurality of emission-side unit cells C1out on the light incidence surface S1out. Here, each incidence-side unit cell C1in is common to (formed in common with) each emission-side unit cell C1out. In other words, one incidence-side unit cell C1in and one emission-side unit cell C1out configure one common unit cell.

In the fly-eye lens 151, the plurality of such common unit cells (incidence-side unit cells C1in and emission-side unit cells C1out) are arranged along both an X-axis direction (first direction: horizontal direction in this example embodiment) and a Y-axis direction (second direction: vertical direction in this example embodiment). That is, the incidence-side unit cells C1in and the emission-side unit cells C1out are closely arranged in a two-dimensional manner (arranged in a matrix in this example embodiment) on an X-Y plane (the light incidence surface S1in and the light incidence surface S1out). Each common unit cell (the incidence-side unit cell C1in and the emission-side unit cell C1out) has an anisotropic shape (a rectangular shape in this example embodiment) with a major-axis direction as the X-axis direction and a minor-axis direction as the Y-axis direction. The aspect ratio (length ratio of the major-axis direction to the minor-axis direction) of the anisotropic shape (rectangular shape) is determined to be substantially equal to (preferably equal to) the aspect ratio of a reflective liquid crystal device 21 described later.

On the other hand, the fly-eye lens 152 has an incidence-side array A2in including a plurality of unit cells arranged on a light incidence surface S2in onto which incident light L2in is to be incident from the fly-eye lens 151 side. In addition thereto, the fly-eye lens 152 has an emission-side array A2out including a plurality of unit cells arranged on a light emission surface S2out through which light is emitted.

Specifically, for example, as illustrated in FIG. 3B, the fly-eye lens 152 has a plurality of incidence-side unit cells C2in (first unit cells) on the light-incidence surface S2in, and has a plurality of emission-side unit cells C2out (second unit cells) on the light-emission surface S2out. The fly-eye lens 152, however, is different from the fly-eye lens 151 in that the incidence-side unit cells C2in and the emission-side unit cells C2out are independently (separately) provided.

In the fly-eye lens 152, as in the common unit cells of the fly-eye lens 151, the incidence-side unit cells C2in and the emission-side unit cells C2out are each arranged along both the X-axis direction (horizontal direction) and the Y-axis direction (vertical direction). That is, the incidence-side unit cells C2in and the emission-side unit cells C2out are each two-dimensionally arranged on an X-Y plane (the light incidence surface S2in and the light incidence surface S2out). Specifically, the incidence-side unit cells C2in are closely arranged in a matrix on the light incidence surface S2in. In detail, adjacent arrays of the incidence-side unit cells C2in are (alternately) disposed with a displacement of approximately half pitches (preferably half pitches) from each other along one or both of the X-axis direction and the Y-axis direction (Y-axis direction in this example embodiment). On the other hand, the emission-side unit cells C2out are closely and finely arranged on the light emission surface S2out. In detail, adjacent arrays of the emission-side unit cells C2out are (alternately) disposed with a displacement of approximately half pitches (preferably half pitches) from each other along one or both of the X-axis direction and the Y-axis direction (both the X-axis direction and the Y-axis direction in this example embodiment). In addition, each incidence-side unit cell C2in and each emission-side unit cell C2out, which are in opposition to each other, are disposed such that positions (positions indicated by dots in FIG. 3B) of the central points of the unit cells C2in and C2out substantially correspond to (preferably correspond to) each other.

In the fly-eye lens 152, as in the common unit cells of the above-described fly-eye lens 151, the incidence-side unit cell C2in has an anisotropic shape (a rectangular shape in this example embodiment) with a major-axis direction as the X-axis direction and a minor-axis direction as the Y-axis direction. The aspect ratio of the anisotropic shape (rectangular shape) is set to be substantially equal to (preferably equal to) the aspect ratio of the reflective liquid crystal device 21 described later. On the other hand, the emission-side unit cell C2out has a shape protruding (extending and projecting) along both the X-axis and Y-axis directions. Specifically, the emission-side unit cell C2out has a shape substantially isotropic (preferably isotropic) along the X-axis direction and the Y-axis direction in contrast to the incidence-side unit cell C2in (anisotropic shape). For example, the emission-side unit cells C2out each may have a rhombic shape (a rhombic shape having diagonals substantially equal in length (preferably equal in length) between the X-axis direction and the Y-axis direction). It is to be noted that the emission-side unit cell C2out preferably has a length in the X-axis direction (horizontal direction), the length being equal to or smaller than the length in the X-axis direction (major-axis direction) of the incidence-side unit cell C2in. Moreover, the emission-side unit cell C2out preferably has a length in the Y-axis direction (vertical direction), the length being larger than the length in the Y-axis direction (minor-axis direction) of the incidence-side unit cell C2in. More specifically, the length in the Y-axis direction of the emission-side unit cell C2out preferably corresponds to the product of the length in the X-axis direction (horizontal direction) thereof and twice the aspect ratio of the incidence-side unit cell C2in (the length in the Y-axis direction=length in the X-axis direction×aspect ratio×2). This relational expression is determined through the above-described condition of fine arrangement of the emission-side unit cells C2out, and is in detail derived in the following way. It is to be noted that such preferable length in each of the X-axis direction (first direction) and the Y-axis direction (second direction) of the emission-side unit cell C2out also holds true in Modifications described later.

$$\text{Length in } Y\text{-axis direction of emission-side unit cell } C2out =$$
$$(\text{length in } Y\text{-axis direction of incidence-side unit cell } C2in \times 2) =$$
$$\{\text{length in } X\text{-axis direction of incidence-side unit cell } C2in \times$$
$$(\text{length in } Y\text{-axis direction of incidence-side unit cell } C2in/$$
$$\text{length in } X\text{-axis direction of incidence-side unit cell } C2in) \times$$
$$2\} = (\text{length in } X\text{-axis direction of incidence-side unit}$$
$$\text{cell } C2in \times \text{aspect ratio} \times 2) = (\text{length in } X\text{-axis direction}$$
$$\text{of emission-side unit cell } C2out \times \text{aspect ratio} \times 2)$$

The fly-eye lens 151 corresponds to a specific but not limitative example of "first uniformizing optical member" in one embodiment of the disclosure. The fly-eye lens 152 corresponds to a specific but not limitative example of "second uniformizing optical member" in one embodiment of the disclosure.

The sub-condenser lens 161 is a lens that condenses light emitted from the fly-eye lens 151, and allows the condensed light to be incident on the optical device 14. Similarly, the sub-condenser lens 162 is a lens that condenses light emitted from the optical device 14, and allows the condensed light to be incident on the fly-eye lens 152. The sub-condenser lenses 161 and 162 configure a relay optical system. The condenser lens 17 is a lens that condenses the light L2out emitted from the fly-eye lens 152, and allows the condensed light to be emitted in a form of illumination light.

(Display Optical System)

The display optical system is configured of a polarization beam splitter (PBS) 23, a field lens 22, the reflective liquid crystal device 21, and a projection lens 24 (projection optical system).

The polarization beam splitter 23 is an optical member that selectively transmits one polarized light (for example, s-polarized light), and selectively reflects the other polarized light (for example, p-polarized light). Thus, illumination light (for example, s-polarized light) from the illuminating unit 1 is selectively reflected and enters the reflective liquid crystal device 21, and image light (for example, p-polarized light) emitted from the reflective liquid crystal device 21 is selectively transmitted and enters the projection lens 24.

The field lens 22 is disposed on an optical path between the polarization beam splitter 23 and the reflective liquid crystal device 21. The field lens 22 is a lens that allows illumination light to be telecentrically incident on the reflective liquid crystal device 21 to achieve a reduction in size of the optical system.

The reflective liquid crystal device 21 is a light modulation device that emits image light through reflecting the illumination light from the illuminating system 1 while modulating the illumination light based on an image signal supplied from an undepicted display control section. Here, the reflective liquid crystal device 21 reflects light such that incident light and outgoing light have different types of polarized light (for example, s-polarized light and p-polarized light). The reflective liquid crystal device 21 may be formed of, for example, a liquid crystal device such as liquid crystal on silicon (LCOS).

The projection lens 24 is a lens that (expansively) projects the illumination light (image light) modulated by the reflective liquid crystal device 21 onto the screen 30.

[Functions and Effects of Display 3]

(1. Display Operation)

In the display 3, as illustrated in FIG. 1, first, the illuminating system 1 operates such that light (laser light) is emitted from each of the red laser 11R, the green laser 11G, and the blue laser 11B, and is collimated by each of the coupling lenses 12R, 12G, and 12B into parallel light. Then, such kinds of laser light (red laser light, green laser light, and blue laser light) formed into parallel light in the above way are subjected to color composition (optical path composition) by the dichroic prisms 131 and 132. Each laser light subjected to optical path composition passes through the fly-eye lens 151, the sub-condenser lens 161, the optical device 14, the sub-condenser lens 162, the fly-eye lens 152, and the condenser lens 17 in this order, and is then emitted in a form of illumination light. During this operation, the light L2out emitted from the fly-eye lens 152 is uniformized by the fly-eye lenses 151 and 152, i.e., in-plane distribution of the quantity of light is uniformized. In this way, the illuminating system 1 emits light as illumination light.

The illumination light is then selectively reflected by the polarization beam splitter 23, and the reflected light enters the reflective liquid crystal device 21 through the field lens 22. The reflective liquid crystal device 21 reflects the incident light while modulating the light based on an image signal, and thus emits the light in a form of image light. Here, the reflective liquid crystal device 21 allows polarization upon incidence and polarization upon outgoing of light to be different. Hence, the image light exiting from the reflective liquid crystal device 21 selectively passes through the polarization beam splitter 23, and then enters the projection lens 24. The incident light (image light) is then (expansively) projected onto the screen 30 by the projection lens 24.

In this operation, for example, the red laser 11R, the green laser 11G, and the blue laser 11B each may intermittently emit light at a predetermined emission frequency. As a result, the three kinds of laser light (red laser light, green laser light, and blue laser light) are time-divisionally and sequentially emitted. In addition, the reflective liquid crystal device 21 time-divisionally and sequentially modulates laser light of a corresponding color based on an image signal of each color component (a red component, a green component, and a blue component). In this way, the display 3 performs color image display based on the image signals.

(2. Functions of Fly-Eye Lenses 151 and 152)

The functions of the fly-eye lenses 151 and 152 are now described in detail in comparison with comparative examples (comparative examples 1 and 2).

Figure 4:
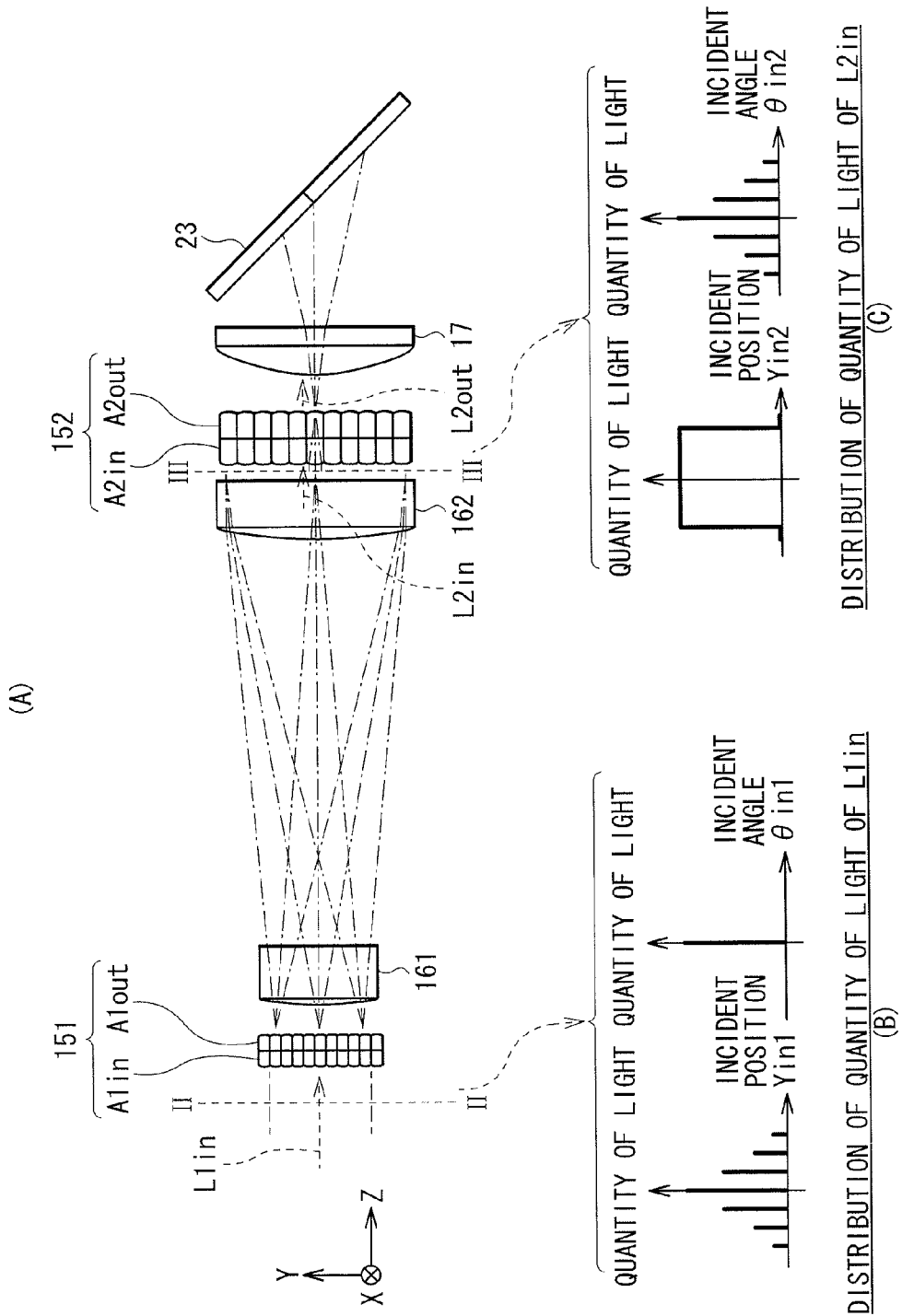
FIG. 4 is a schematic diagram for describing exemplary distribution of the quantity of incident light on each of the two fly-eye lenses illustrated in FIG. 1.

First, for example, as illustrated in (A) to (C) of FIG. 4, the fly-eye lenses 151 and 152 each show the following distribution of the quantity of incident light (distribution of the quantity of light with respect to an incident position and an incident angle). Specifically, for example, as illustrated in (B) of FIG. 4, distribution of the quantity of light in a region along a II-II line of the incident light L1in on the fly-eye lens 151 shows a Gaussian distribution pattern with respect to an incident position Yin1, but hardly shows distribution with respect to an incident angle θin1 (θin1≈0°). On the other hand, for example, as illustrated in (C) of FIG. 4, distribution of the quantity of light in a region along a line of the incident light L2in on the fly-eye lens 152 shows constant distribution in a predetermined range (distribution with a constant light quantity value) with respect to an incident position Yin2, but shows a Gaussian distribution pattern with respect to an incident angle θin2. In other words, distribution of the quantity of light of the incident light L1in on the former-stage fly-eye lens 151 with respect to each of the incident position Yin1 and the incident angle θin1 is inversely converted to distribution of the quantity of light of the incident light L2in on the latter-stage fly-eye lens 152 with respect to each of the incident angle θin2 and the incident position Yin2. As a result, for example, if the incident light L1in has wide distribution of the quantity of light with respect to the incident position Yin1 (the laser light source has a wide divergence angle), the incident light L2in has wide distribution of the quantity of light with respect to the incident angle θin2. Conversely, if the incident light L1in has narrow distribution of the quantity of light with respect to the incident position Yin1 (the laser light source has a narrow divergence angle), the incident light L2in has narrow distribution of the quantity of light with respect to the incident angle θin2.

In this way, the two (two-stage) fly-eye lenses 151 and 152 are provided in the illuminating device 1, thereby achieving the following advantage compared with a case where only one (one-stage) fly-eye lens is provided. Specifically, in general, in an optical system including laser as a light source, the divergence angle of the laser varies, which causes a variation in depth of focus and/or a variation in level of the speckle noise, resulting in a significant variation in projector characteristics. Such influence of variations in divergence angle of laser is reduced or made little in the two-stage configuration of the fly-eye lens compared with the one-stage configuration of the fly-eye lens.

In this way, the incident light L2in on the latter-stage fly-eye lens 152 becomes beams having the predetermined incident angle θin2. Specifically, the incident angle θin2 is defined by formula (1) using a focal distance f(relay) of the relay lens (sub condenser lens 161 and 162) and a beam diameter φ1 of the incident light L1in on the former-stage fly-eye lens 151.

$$\theta in2 = \text{Arc sin}\{0.5 \times \phi1/f(relay)\} \quad (1)$$

In the case where the incident light L2in including beams having the incident angle θin2 is incident on the second-stage fly-eye lens 152, and if the incident angle θin2 (obliquely incident angle) is equal to or smaller than a predetermined angle (an allowable angle θlimit) (θin2≤θlimit), loss of the quantity of light does not occur. On the other hand, if that incident angle θin2 exceeds the allowable angle θlimit (θin2>θlimit), a light component, which goes out of the reflective liquid crystal device 21, is produced during illumination of the reflective liquid crystal device 21, leading to loss of the quantity of light. Such loss of the quantity of light reduces use efficiency of light emitted from the laser light source, leading to a reduction in brightness (luminance) during image display.

Figure 5:
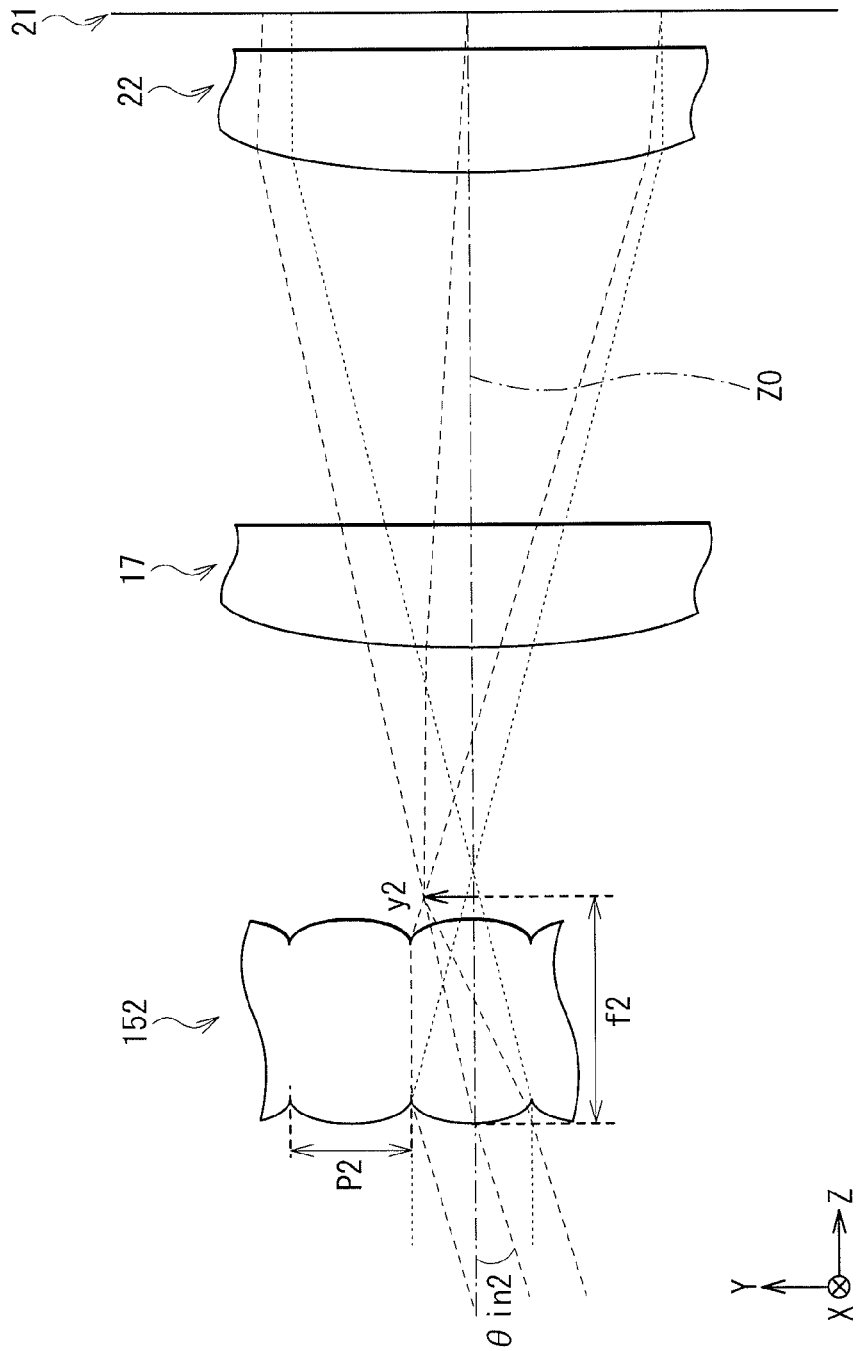
FIG. 5 is a schematic diagram for describing an allowable angle for an incident angle of incident light on a latter-stage fly-eye lens illustrated in FIG. 1.

It is to be noted that the allowable angle θlimit for the incident angle θin2 of the incident light L2in on the fly-eye lens 152 is determined as follows. Specifically, for example, as illustrated in FIG. 5, when the focal distance of the fly-eye lens 152 is defined as f2, a division pitch (a pitch of unit cells) in the Y-axis direction (vertical direction) of the fly-eye lens 152 is defined as P2, and displacement from the light axis Z0 in the Y-axis direction at a position of the focal distance f2 is defined as y2, the following relationships represented by formulas (2) and (3) are established for θin2 and θlimit.

$$Y2 = \{f2 \times \tan(\theta in2)\} \leq (P2/2) \quad (2)$$

$$\{f2 \times \tan(\theta limit)\} = (P2/2) \quad (3)$$

As illustrated in FIGS. 3A and 3B described above, the common unit cell (the incidence-side unit cell C1in and the emission-side unit cell C1out) of the fly-eye lens 151 and the incidence-side unit cell C2in of the fly-eye lens 152 each have the anisotropic shape. Specifically, each of the unit cells is configured to have a rectangular shape with a major-axis direction as the X-axis direction and a minor-axis direction as the Y-axis direction to have an aspect ratio that is substantially equal to (preferably equal to) the aspect ratio of the reflective liquid crystal device 21. As a result, a division pitch P2 (a pitch of the incidence-side unit cells C2in) of the fly-eye lens 152 is small in the Y-axis direction (vertical direction) compared with in the X-axis direction (horizontal direction). Thus, the following knowledge is given with reference to formula (3). That is, the allowable angle ° limit is small in the Y-axis direction (vertical direction) compared with in the X-axis direction (horizontal direction), and therefore loss of the quantity of light easily occur. In this way, when the illumination light emitted from the fly-eye lens 152 is applied to the reflective liquid crystal device 21, a direction (minor-axis direction), in which loss of the quantity of light easily occur, exists due to the anisotropic shape of each of unit cells (the incidence-side unit cells C1in and C2in, and the emission-side unit cell C1out).

Comparative Example 1

Figure 6A:
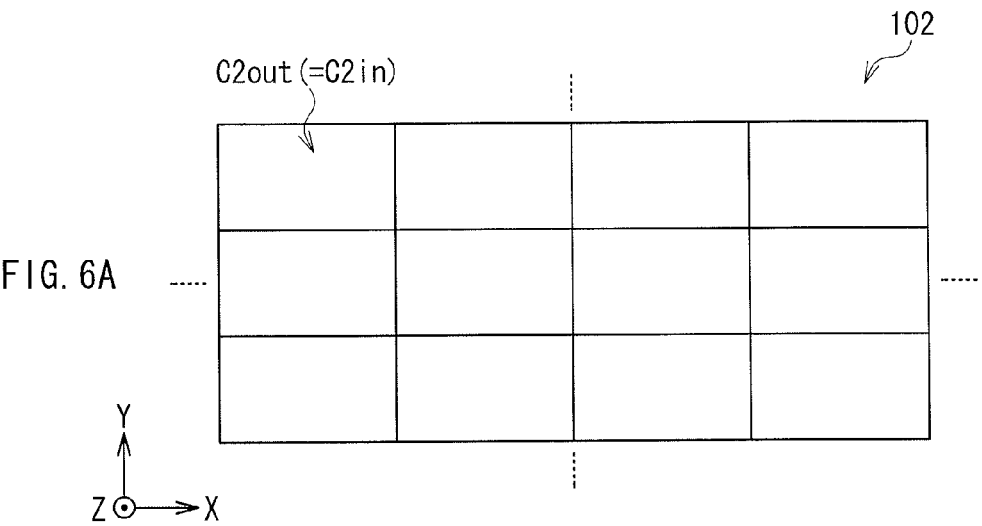
FIGS. 6A and 6B are schematic diagrams illustrating an exemplary configuration and functions of a latter-stage fly-eye lens according to a comparative example 1.

Consequently, the following difficulty occurs when a latter-stage fly-eye lens has a unit cell structure similar to that of the former-stage fly-eye lens 151 (the anisotropic shape common to the incidence-side unit cell C2in and the emission-side unit cell C2out), as illustrated by a latter-stage fly-eye lens 102 according to comparative example 1 illustrated in FIG. 6A, for example.

Figure 6B:
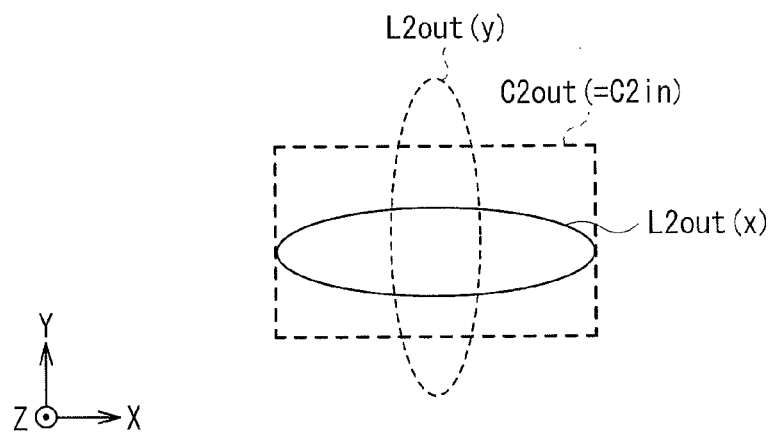

Specifically, in this case, the X-axis direction is the major-axis direction, and the Y-axis direction is the minor-axis direction. Hence, as described above, the allowable angle θlimit is small in the Y-axis direction (vertical direction) compared with in the X-axis direction (horizontal direction). As a result, if laser light having FFP with a wide divergence angle in the X-axis direction is incident as the incident light L2in, loss of the quantity of light is less likely to occur, but if laser light having FFP with a wide divergence angle in the Y-axis direction is incident as the incident light L2in, loss of the quantity of light easily occur. It is to be noted that FIG. 6B illustrates exemplary distribution of the quantity of emission light L2out, where the distribution is shown as L2out(x) if laser light having FFP with a wide divergence angle in the X-axis direction is incident as the incident light L2in, and where the distribution is shown as L2out(y) if laser light having FFP with a wide divergence angle in the Y-axis direction is incident as the incident light L2in. The same holds true hereinafter.

Comparative Example 2

Figure 7A:
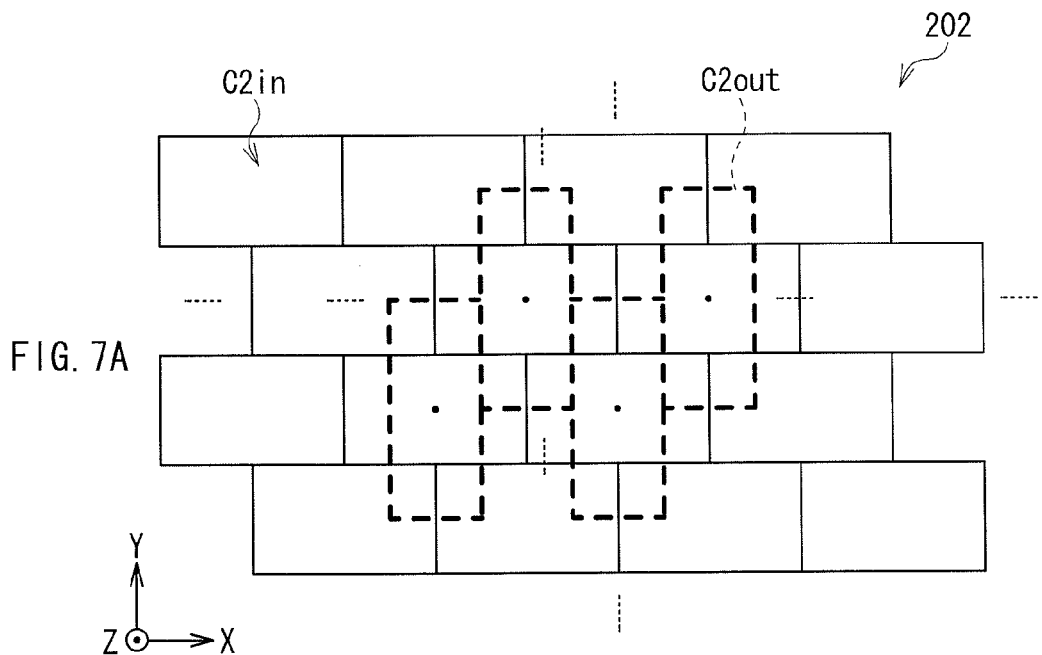
FIGS. 7A and 7B are schematic diagrams illustrating an exemplary configuration and functions of a latter-stage fly-eye lens according to a comparative example 2.

In a latter-stage fly-eye lens 202 according to comparative example 2 illustrated in FIG. 7A, the incidence-side unit cell C2in has a rectangular shape with a major-axis direction as the X-axis direction and a minor-axis direction as the Y-axis direction, and the emission-side unit cell C2out has a rectangular shape with a major-axis direction as the Y-axis direction and a minor-axis direction as the X-axis direction.

Figure 7B:
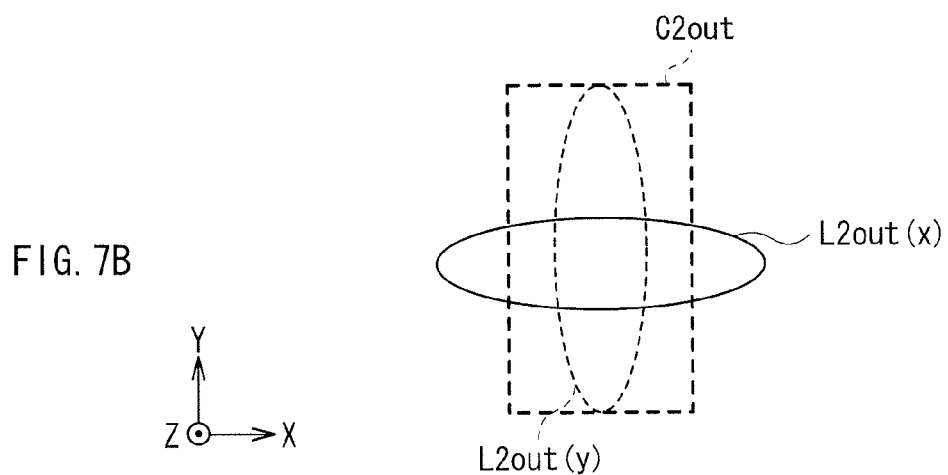

In the case of the comparative example 2, contrary to the comparative example 1, the allowable angle θlimit is small in the X-axis direction (horizontal direction) compared with in the Y-axis direction (vertical direction). As a result, if laser light having FFP with a wide divergence angle in the Y-axis direction is incident as the incident light L2in, loss of the quantity of light is less likely to occur, but if laser light having FFP with a wide divergence angle in the X-axis direction is incident as the incident light L2in, loss of the quantity of light easily occur (for example, see FIG. 7B).

In this way, in the comparative examples 1 and 2, not only the common unit cell (the incidence-side unit cell C1in and the emission-side unit cell C1out) of the fly-eye lens 151 but also the incidence-side unit cell C2in and the emission-side unit cell C2out of each of the fly-eye lenses 102 and 202 have the anisotropic shape each. In other words, unlike a case of the present embodiment described later, the emission-side unit cell C2out of each of the latter-stage fly-eye lenses 102 and 202 also has a shape (an non-isotropic shape with respect to the X-axis direction and the Y-axis direction) protruding along only one of the X-axis direction (horizontal direction) and the Y-axis direction (vertical direction). Consequently, as described above, loss of the quantity of light may easily occur depending on the spreading direction of the divergence angle of FFP of the incident light L2in (laser light).

It is to be noted that a spreading direction (profile) of a divergence angle of FFP and polarization direction of laser light emitted from a laser light source are each determined uniquely to the laser light source. Hence, if the spreading direction of the divergence angle of FFP of laser light is adjusted to be along the major-axis direction of the emission-side unit cell C2out of the latter-stage fly-eye lens in each of the laser light sources in the light source section, loss of the quantity of light may be difficult to occur even in the unit cell structure of each of the comparative examples 1 and 2.

The polarization direction of laser light, however, may vary depending on kinds of the laser light sources even if the divergence angles of FFP of laser light have the same spreading direction. Specifically, an example is given here where two laser light sources each have a spreading direction of a divergence angle of FFP of laser light in a vertical direction, in which one laser light source has a polarization direction of laser light in a horizontal direction, and the other laser light source has a polarization direction of laser light in the vertical direction. In such a case, in the case where image display is performed using the polarization characteristics of the reflective liquid crystal device 21 and those of the polarization beam splitter 23 (a common method), a difference in polarization direction of laser light becomes disadvantageous in the unit cell structure of each of the comparative examples 1 and 2.

In such a case, arranging polarization directions of laser light in one direction with use of a retardation film such as a half-wave film allows for suppression of the occurrence of loss of the quantity of light, and allows for prevention of the disadvantage in image display. In this case, however, loss of the quantity of light occurs due to the retardation film that transmits only a partial polarization component, leading to a reduction in brightness of illumination light. Also, the number of component parts disadvantageously increases due to the addition of retardation film, leading to an increase in cost. Furthermore, it may be difficult to dispose at an angle each laser light source to arrange FFP (spreading directions of divergence angles) of laser light from laser light sources in one direction, due to a reason in actual design of an illuminating device, such as limitations of outside shape, for example. For such reasons, it is necessary to suppress occurrence of loss of the quantity of light without depending on the spreading direction of the divergence angle of FFP of the incident light L2in (laser light).

(Functions of the Embodiment)

Therefore, in the illuminating device 1 of the present embodiment, for example, as illustrated in FIG. 3B, a plurality of incidence-side unit cells C2in arranged on the light incidence surface S2in of the latter-stage fly-eye lens 152 each have an anisotropic shape (a rectangular shape) with a major-axis direction as the X-axis direction and a minor-axis direction as the Y-axis direction. On the other hand, a plurality of emission-side unit cells C2out arranged on the light emission surface S2out of the fly-eye lens 152 each have a shape protruding along both the X-axis direction and the Y-axis direction (substantially isotropic shape along the X-axis direction and the Y-axis direction compared with the incidence-side unit cell C2 in).

Figure 8:
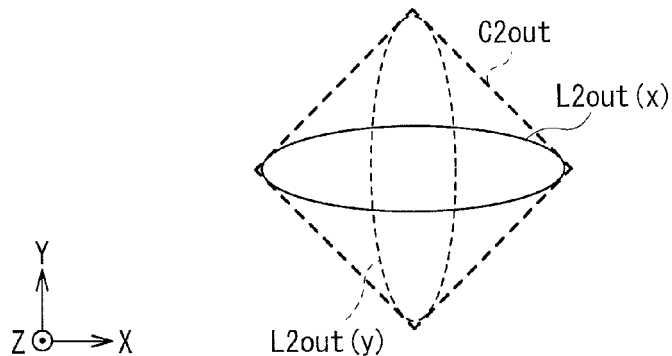
FIG. 8 is a schematic diagram illustrating functions of the latter-stage fly-eye lens illustrated in FIG. 1.

Consequently, unlike the comparative examples 1 and 2, an allowable angle θlimit in the X-axis direction (horizontal direction) and an allowable angle θlimit in the Y-axis direction (vertical direction) have large values substantially equal to (preferably equal to) each other. Hence, even when the unit cell on the incidence surface S2 (the incidence-side unit cell C2in) has the above-described anisotropic shape, and even if the incident angle θin2 of the incident light L2in onto the latter-stage fly-eye lens 152 from the former-stage fly-eye lens 151 is along the minor-axis direction (Y-axis direction in this example embodiment), the incident angle θin2 easily comes into equal to or smaller than the predetermined allowable angle θlimit. As a result, even if either of laser light having FFP with a large divergence angle in the X-axis direction and laser light having FFP with a large divergence angle in the Y-axis direction is incident as the incident light L2in, loss of the quantity of light is less likely to occur (for example, see FIG. 8). That is, in the present embodiment, unlike the comparative examples 1 and 2, loss of the quantity of light is less likely to occur independent of the spreading direction of the divergence angle of FFP of the incident light L2in (laser light). In other words, loss of the quantity of light is reduced without consideration of (concern for) factors such as a difference in polarization direction of laser light and possibility of disposing the laser light source at an angle as described above, for example.

An example of the above-described parameters in the present embodiment includes the following parameters that are so set as to satisfy the above-described condition of θin2≤θlimit.

Focal distance f(relay) of relay lens=13.2 (mm)

Beam diameter φ1 of incident light L1in on fly-eye lens 151=3 (mm)

(Parallel beam diameter where beams emitted from a laser light source is 100% coupled)

Incident angle θin2=Arc sin {0.5×φ1/f(relay)}=6.52(°)

(Actually, a divergence angle of about 2.50° is added by the optical device 14, and hence θin2=6.52°+2.50°=9.02° is given. However, actually, the quantity of light in the foot of the distribution of the quantity of light of the incident light L2in may be removed, and consequently "the effective angle of θin2=about 7°" is given).

Focal distance f2 of fly-eye lens=0.46 (mm)

Division pitch P2 in Y-axis direction of fly-eye lens 152=0.116 (mm)

Allowable angle θlimit=7.19 (°) (from formulas (2) and (3) described above)

As described above, in the present embodiment, the plurality of incidence-side unit cells C2in arranged on the light incidence surface S2in of the fly-eye lens 152 each have the anisotropic shape with the major-axis direction as the X-axis direction and the minor-axis direction as the Y-axis direction. In addition, the plurality of emission-side unit cells C2out arranged on the light emission surface S2out of the fly-eye lens 152 each have the shape protruding along both the X-axis direction and the Y-axis direction. This allows the incident angle θin2 of the incident light L2in on the fly-eye lens 152 to easily come into equal to or smaller than the predetermined allowable angle θlimit. Consequently, when the emission light L2out (illumination light) from the fly-eye lens 152 is applied to the subsequent stage (the reflective liquid crystal device 21 in this example embodiment), loss of the quantity of light is reduced, i.e., light use efficiency is improved.

In addition, loss of the quantity of light is reduced without consideration of factors such as a difference in polarization direction of laser light and possibility of disposing the laser light source at an angle as described above, making it possible to avoid an increase in cost due to an additional member such as the above-described retardation film, and reduce a size of an optical system (a size of a device).

[Modifications]

Modifications (Modifications 1 to 3) of the above-described embodiment will now be described. It is to be noted that the same elements as those in the embodiment are designated by the same symbols, and description thereof is appropriately omitted.

[Modification 1]

Figure 9A:
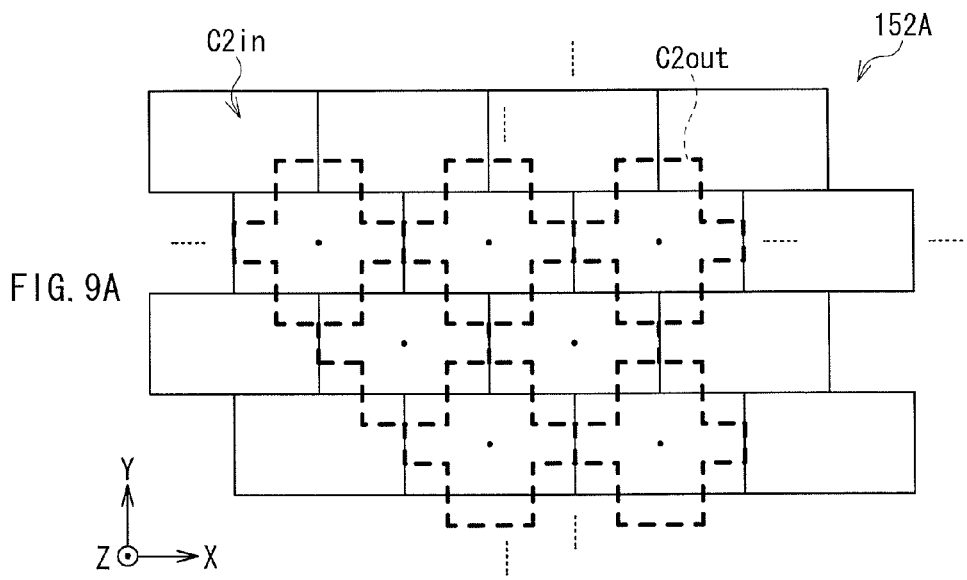
FIGS. 9A and 9B are schematic diagrams illustrating an exemplary configuration and functions of a latter-stage fly-eye lens according to Modification 1.
Figure 9B:
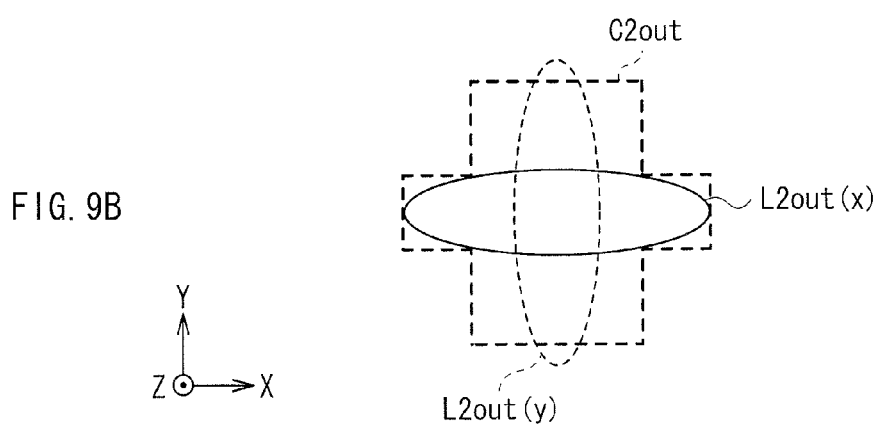

FIG. 9A schematically illustrates an exemplary configuration of a latter-stage fly-eye lens (fly-eye lens 152A) according to Modification 1. As in the fly-eye lens 152 of the embodiment described above, the fly-eye lens 152A of the Modification 1 is also individually provided with the plurality of incidence-side unit cells C2in on the light-incidence surface S2in and the plurality of emission-side unit cells C2out on the light-emission surface S2out.

In addition, as in the fly-eye lens 152, the incidence-side unit cells C2in are closely arranged in a matrix on the light incidence surface S2in, and the emission-side unit cells C2out are closely and finely arranged on the light emission surface S2out. In detail, adjacent arrays of the incidence-side unit cells C2in are (alternately) disposed with a displacement of approximately half pitches (preferably half pitches) from each other along the Y-axis direction. In addition, adjacent arrays of the emission-side unit cells C2out are (alternately) disposed with a displacement of approximately half pitches (preferably half pitches) from each other along both the X-axis direction and the Y-axis direction. In addition, each incidence-side unit cell C2in and each emission-side unit cell C2out, which are in opposition to each other, are disposed such that a position of the central point of the incidence-side unit cell C2in substantially corresponds (preferably corresponds) to a position of the central point of the emission-side unit cell C2out.

Furthermore, as in the fly-eye lens 152, the incidence-side unit cell C2in has an anisotropic shape (rectangular shape) with a major-axis direction as an X-axis direction and a minor-axis direction as a Y-axis direction, and the emission-side unit cell C2out has a shape protruding along both the X-axis direction and the Y-axis direction. Specifically, the emission-side unit cell C2out has a shape substantially isotropic (preferably isotropic) along the X-axis direction and the Y-axis direction in contrast to the incidence-side unit cell C2in (anisotropic shape).

In the fly-eye lens 152A, however, unlike the fly-eye lens 152, the emission-side unit cell C2out has a cross shape (a cross shape with axes having substantially the same length (preferably the same length) along the X-axis direction and the Y-axis direction).

The Modification 1 using the fly-eye lens 152A having such a configuration also achieves advantageous effects similar to those of the above-described embodiment through similar functions. Specifically, an allowable angle θlimit in the X-axis direction (horizontal direction) and an allowable angle θlimit in the Y-axis direction (vertical direction) have large values that are substantially equal to (preferably equal to) each other. Hence, even when the unit cell on the incidence surface S2 (the incidence-side unit cell C2 in) has the above-described anisotropic shape, and even if the incident angle θin2 of the incident light L2in onto the latter-stage fly-eye lens 152A from the former-stage fly-eye lens 151 is along the minor-axis direction (Y-axis direction), the incident angle θin2 easily comes into equal to or smaller than the predetermined allowable angle θlimit. As a result, even if either of laser light having FFP with a large divergence angle in the X-axis direction and laser light having FFP with a large divergence angle in the Y-axis direction is incident as the incident light L2in, loss of the quantity of light is less likely to occur (for example, see FIG. 9A). Consequently, when the emission light L2out (illumination light) from the fly-eye lens 152A is applied to the subsequent stage (the reflective liquid crystal device 21), loss of the quantity of light is reduced, i.e., light use efficiency is improved.

[Modifications 2 and 3]

Figure 10A:
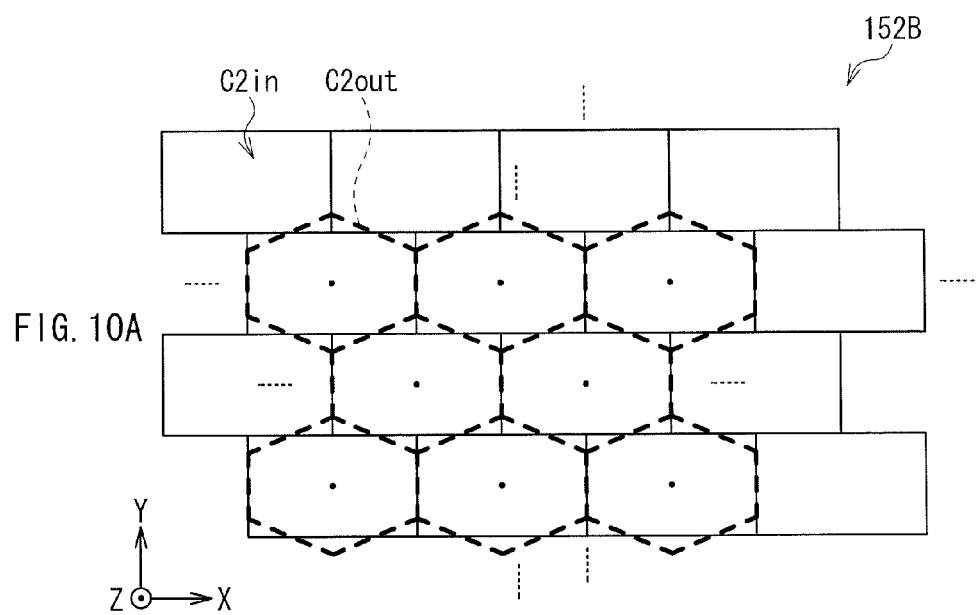
FIGS. 10A and 10B are schematic diagrams illustrating exemplary configurations of latter-stage fly-eye lenses according to Modifications 2 and 3, respectively.
Figure 10B:
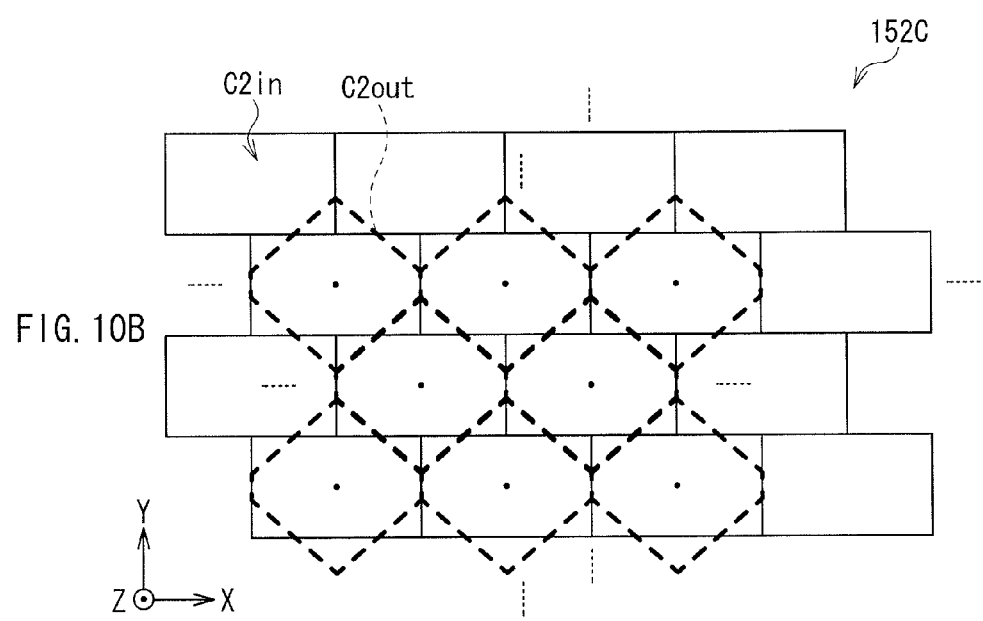

FIG. 10A schematically illustrates an exemplary configuration of a latter-stage fly-eye lens (fly-eye lens 152B) according to Modification 2. FIG. 10B schematically illustrates an exemplary configuration of a latter-stage fly-eye lens (fly-eye lens 152C) according to Modification 3.

As in the fly-eye lens 152 of the embodiment described above, each of the fly-eye lenses 152B and 152C of the Modifications 2 and 3 is also individually provided with the plurality of incidence-side unit cells C2in on the light-incidence surface S2in and the plurality of emission-side unit cells C2out on the light-emission surface S2out.

In addition, as in the fly-eye lens 152, the incidence-side unit cells C2in are closely arranged in a matrix on the light incidence surface S2in, and the emission-side unit cells C2out are closely and finely arranged on the light emission surface S2out. In detail, adjacent arrays of the incidence-side unit cells C2in are (alternately) disposed with a displacement of approximately half pitches (preferably half pitches) from each other along the Y-axis direction. In addition, adjacent arrays of the emission-side unit cells C2out are (alternately) disposed with a displacement of approximately half pitches (preferably half pitches) from each other along both the X-axis direction and the Y-axis direction. In addition, each incidence-side unit cell C2in and each emission-side unit cell C2out, which are in opposition to each other, are disposed such that a position of the central point of the incidence-side unit cell C2in substantially corresponds to (preferably corresponds to) a position of the central point of the emission-side unit cell C2out.

Furthermore, as in the fly-eye lens 152, the incidence-side unit cell C2in has an anisotropic shape (rectangular shape) with a major-axis direction as an X-axis direction and a minor-axis direction as a Y-axis direction, and the emission-side unit cell C2out has a shape protruding along both the X-axis direction and Y-axis direction. Specifically, the emission-side unit cell C2out has a shape substantially isotropic (preferably isotropic) along the X-axis direction and the Y-axis direction in contrast to the incidence-side unit cell C2in (anisotropic shape).

In the fly-eye lenses 152B and 152C, however, unlike the fly-eye lens 152, the emission-side unit cell C2out has a hexagonal shape. It is to be noted that the fly-eye lens 152C has length in the X-axis direction and length in the Y-axis direction, of which the values are close to each other (the aspect ratios are each close to one), and thus the hexagonal shape of the emission-side unit cell C2out is close to an isotropic shape, compared with the fly-eye lens 152B.

Figure 11A:
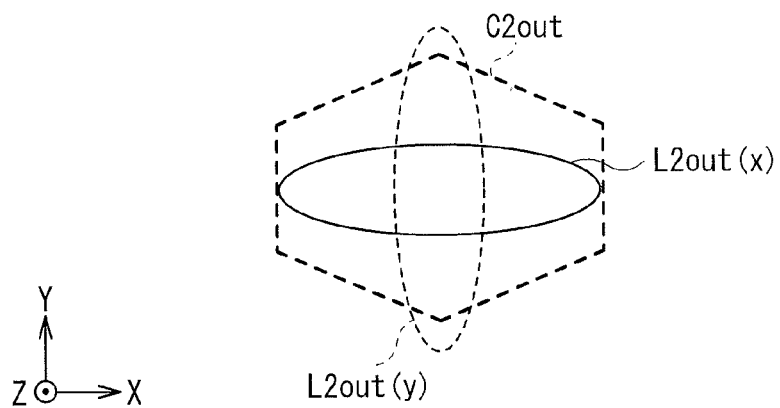
FIGS. 11A and 11B are schematic diagrams illustrating functions of the latter-stage fly-eye lenses according to the Modifications 2 and 3, respectively.
Figure 11B:
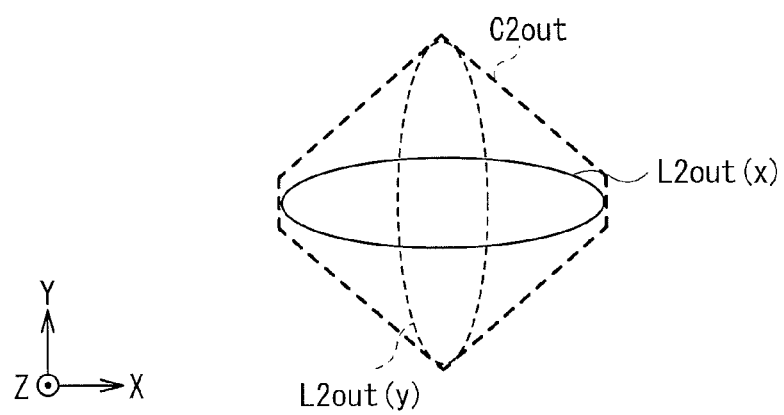

The Modifications 2 and 3 using the fly-eye lenses 152B and 152C having such configurations, respectively, also achieve advantageous effects similar to those of the above-described embodiment through similar functions. Specifically, the allowable angle θlimit in the X-axis direction (horizontal direction) and the allowable angle θlimit in the Y-axis direction (vertical direction) have large values that are substantially equal to (preferably equal to) each other. Hence, even when the unit cell on the incidence surface S2 (the incidence-side unit cell C2 in) has the above-described anisotropic shape, and even if the incident angle θin2 of the incident light L2in onto the latter-stage fly-eye lens 152B or 152C from the former-stage fly-eye lens 151 is along the minor-axis direction (Y-axis direction), the incident angle θin2 easily comes into equal to or smaller than the predetermined allowable angle θlimit. As a result, even if either of laser light having FFP with a large divergence angle in the X-axis direction and laser light having FFP with a large divergence angle in the Y-axis direction is incident as the incident light L2in, loss of the quantity of light is less likely to occur (Modification 2: for example, see FIG. 11A, Modification 3: for example, see FIG. 11B). Consequently, when the emission light L2out (illumination light) from each of the fly-eye lenses 152B and 152C is applied to the subsequent stage (the reflective liquid crystal device 21), loss of the quantity of light is reduced, i.e., light use efficiency is improved.

As described above, the emission-side unit cell C2out of the fly-eye lens 152C has the hexagonal shape that is more isotropic than that of the fly-eye lens 152B. Hence, the fly-eye lens 152C achieves further reduction in loss of the quantity of light, namely, achieves further improvement in light use efficiency, compared with the fly-eye lens 152B.

[Other Modifications]

Although the technology according to the present disclosure has been described with the example embodiment and the Modifications hereinbefore, the technology is not limited thereto, and various modifications or alterations may be made.

For example, although the example embodiment and the Modifications have been described with an exemplary case where the emission-side unit cell C2out (second unit cell) of the latter-stage fly-eye lens has a rhombic, cross, or hexagonal shape, the shape of the second unit cell is not limited thereto. Specifically, the second unit cell may have any other shape as long as the shape is substantially isotropic (preferably isotropic) along the X-axis direction and the Y-axis direction in contrast to the shape protruding along both the X-axis and Y-axis directions (the incidence-side unit cell C2in (first unit cell)). Moreover, although the example embodiment and the Modifications have been described with an exemplary case where "first uniformizing optical member" and "second uniformizing optical member" in one embodiment of the disclosure are each formed of a fly-eye lens, each uniformizing optical member may be formed of another optical member (for example, rod integrator).

Moreover, although the example embodiment and the Modifications have been described with an exemplary case where "first direction" and "second direction" in one embodiment of the disclosure are orthogonal to each other, i.e., a case of horizontal direction (X-axis direction) and vertical direction (Y-axis direction), this is not limitative. That is, such "first direction" and "second direction" may not be orthogonal to each other.

Furthermore, although the example embodiment and the Modifications have been described with an exemplary case where each of the plurality of kinds (in the example embodiment, red, green, and blue) of light sources is a laser light source, this is not limitative, and one or more of the kinds of light sources may be a laser light source. Specifically, a combination of a laser light source and another light source (for example, LED) may be provided within a light source section.

In addition, although the example embodiment and the Modifications have been described with an exemplary case where the light modulation device is a reflective liquid crystal device, this is not limitative. Specifically, for example, the light modulation device may be a transmissive liquid crystal device, or may be a light modulation device (for example, digital micromirror device (DMD)) other than a liquid crystal device.

Moreover, although the example embodiment and the Modifications have been described with an exemplary case using three kinds of light sources that emit light beams having different wavelengths, for example, one, two, or four or more kinds of light sources may be used instead of the three kinds of light sources.

Furthermore, although the example embodiment and the Modifications have been described by giving specific examples of component elements (optical system) of each of the illuminating unit and the display, it is not necessary to provide all of the component elements. Also, other component elements may be further provided. For example, dichroic mirrors may be provided in place of the dichroic prisms 131 and 132.

In addition, although the example embodiment and the Modifications have been described with an exemplary case where a projection optical system (projection lenses), which projects light modulated by a light modulation device onto a screen, is provided to configure a projection display, the example embodiment and the Modifications of the technology may be applied to a direct-view display, for example.

Furthermore, the technology encompasses any possible combination of some or all of the various embodiments and the Modifications described herein and incorporated herein.

It is possible to achieve at least the following configurations from the above-described example embodiments and the Modifications of the disclosure.

(1) An illuminating unit, including:
    a light source section including a laser light source;
    a first uniformizing optical member on which light from the light source section is incident; and
    a second uniformizing optical member including a plurality of first unit cells and a plurality of second unit cells and on which light from the first uniformizing optical member is incident, the first unit cells being arranged on a light incidence surface of the second uniformizing optical member and each having an anisotropic shape with a major-axis direction as a first direction and a minor-axis direction as a second direction, and the second unit cells being arranged on a light emission surface of the second uniformizing optical member and each having a shape protruding along both the first direction and the second direction.

(2) The illuminating unit according to (1), wherein each of the second unit cells has a substantially isotropic shape along the first direction and the second direction in contrast to each of the first unit cells.

(3) The illuminating unit according to (2), wherein each of the second unit cells has one of a rhombic shape, a cross shape, and a hexagonal shape.

(4) The illuminating unit according to any one of (1) to (3), wherein
    the first unit cells are arranged closely and two-dimensionally on the light incidence surface, and
    the second unit cells are arranged closely and two-dimensionally on the light emission surface.

(5) The illuminating unit according to (4), wherein adjacent arrays of the first unit cells are alternately disposed with a displacement along one of the first direction and the second direction on the light incidence surface of the second uniformizing optical member.

(6) The illuminating unit according to (5), wherein the adjacent arrays of the first unit cells are disposed with the displacement of about half pitches.

(7) The illuminating unit according to any one of (4) to (6), wherein a position of a central point of any one of the first unit cells substantially corresponds to a position of a central point of any one of the second unit cells, the any one of the first unit cells and the any one of the second unit cells being in opposition to each other.

(8) The illuminating unit according to any one of (1) to (7), wherein the first uniformizing optical member includes a plurality of common unit cells that are provided in common on a light incidence surface and a light emission surface of the first uniformizing optical member.

(9) The illuminating unit according to any one of (1) to (8), wherein the first direction and the second direction are substantially orthogonal to each other.

(10) The illuminating unit according to any one of (1) to (9), further including:
   an optical device provided on an optical path between the first uniformizing optical member and the second uniformizing optical member; and
   a drive section vibrating the optical device.

(11) The illuminating unit according to any one of (1) to (10), wherein each of the first uniformizing optical member and the second uniformizing optical member includes a fly-eye lens.

(12) The illuminating unit according to any one of (1) to (11), wherein the light source section includes three kinds of laser light sources that emit red light, green light, and blue light as the laser light source.

(13) The illuminating unit according to any one of (1) to (12), wherein the laser light source includes a semiconductor laser.

(14) A display, including:
   an illuminating unit emitting illumination light; and
   a light modulation device modulating the illumination light based on an image signal,
   the illuminating unit including
   a light source section including a laser light source,
   a first uniformizing optical member on which light from the light source section is incident, and
   a second uniformizing optical member including a plurality of first unit cells and a plurality of second unit cells and on which light from the first uniformizing optical member is incident, the first unit cells being arranged on a light incidence surface of the second uniformizing optical member and each having an anisotropic shape with a major-axis direction as a first direction and a minor-axis direction as a second direction, and the second unit cells being arranged on a light emission surface of the second uniformizing optical member and each having a shape protruding along both the first direction and the second direction.

(15) The display according to (14), further including a projection optical system that projects the illumination light modulated by the light modulation device onto a plane of projection.

(16) The display according to (14) or (15), wherein the light modulation device includes a liquid crystal device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illuminating unit, comprising:
   a light source section including a laser light source;
   a first uniformizing optical member on which light from the light source section is incident; and
   a second uniformizing optical member including a plurality of first unit cells and a plurality of second unit cells and on which light from the first uniformizing optical member is incident, the first unit cells being arranged on a light incidence surface of the second uniformizing optical member and each having an anisotropic shape with a major-axis direction as a first direction and a minor-axis direction as a second direction, and the second unit cells being arranged on a light emission surface of the second uniformizing optical member and each having a shape protruding along both the first direction and the second direction.

2. The illuminating unit according to claim 1, wherein each of the second unit cells has a substantially isotropic shape along the first direction and the second direction in contrast to each of the first unit cells.

3. The illuminating unit according to claim 2, wherein each of the second unit cells has one of a rhombic shape, a cross shape, and a hexagonal shape.

4. The illuminating unit according to claim 1, wherein
   the first unit cells are arranged closely and two-dimensionally on the light incidence surface, and
   the second unit cells are arranged closely and two-dimensionally on the light emission surface.

5. The illuminating unit according to claim 4, wherein adjacent arrays of the first unit cells are alternately disposed with a displacement along one of the first direction and the second direction on the light incidence surface of the second uniformizing optical member.

6. The illuminating unit according to claim 5, wherein the adjacent arrays of the first unit cells are disposed with the displacement of about half pitches.

7. The illuminating unit according to claim 4, wherein a position of a central point of any one of the first unit cells substantially corresponds to a position of a central point of any one of the second unit cells, the any one of the first unit cells and the any one of the second unit cells being in opposition to each other.

8. The illuminating unit according to claim 1, wherein the first uniformizing optical member includes a plurality of common unit cells that are provided in common on a light incidence surface and a light emission surface of the first uniformizing optical member.

9. The illuminating unit according to claim 1, wherein the first direction and the second direction are substantially orthogonal to each other.

10. The illuminating unit according to claim 1, further comprising:
    an optical device provided on an optical path between the first uniformizing optical member and the second uniformizing optical member; and
    a drive section vibrating the optical device.

11. The illuminating unit according to claim 1, wherein each of the first uniformizing optical member and the second uniformizing optical member includes a fly-eye lens.

12. The illuminating unit according to claim 1, wherein the light source section includes three kinds of laser light sources that emit red light, green light, and blue light as the laser light source.

13. The illuminating unit according to claim 1, wherein the laser light source includes a semiconductor laser.

14. A display, comprising:
an illuminating unit emitting illumination light; and
a light modulation device modulating the illumination light based on an image signal,
the illuminating unit including
a light source section including a laser light source,
a first uniformizing optical member on which light from the light source section is incident, and
a second uniformizing optical member including a plurality of first unit cells and a plurality of second unit cells and on which light from the first uniformizing optical member is incident, the first unit cells being arranged on a light incidence surface of the second uniformizing optical member and each having an anisotropic shape with a major-axis direction as a first direction and a minor-axis direction as a second direction, and the second unit cells being arranged on a light emission surface of the second uniformizing optical member and each having a shape protruding along both the first direction and the second direction.

15. The display according to claim 14, further comprising a projection optical system that projects the illumination light modulated by the light modulation device onto a plane of projection.

16. The display according to claim 14, wherein the light modulation device includes a liquid crystal device.

* * * * *